US006802017B1

(12) United States Patent
Takayama et al.

(10) Patent No.: US 6,802,017 B1
(45) Date of Patent: Oct. 5, 2004

(54) PARTIAL ENABLING OF FUNCTIONAL UNIT BASED ON DATA AND SIZE PAIR IN REGISTER

(75) Inventors: Shuichi Takayama, Hyogo (JP); Nobuo Higaki, Osaka (JP); Masato Suzuki, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 640 days.

(21) Appl. No.: 09/606,091

(22) Filed: Jun. 29, 2000

(30) Foreign Application Priority Data

Sep. 14, 1999 (JP) ........................................... 11-259976

(51) Int. Cl.⁷ ................................................ G06F 1/32
(52) U.S. Cl. ..................... 713/324; 712/32; 712/210
(58) Field of Search .................... 712/32, 210; 713/324

(56) References Cited

U.S. PATENT DOCUMENTS

| | | | | |
|---|---|---|---|---|
| 4,323,981 A | * | 4/1982 | Nakamura .................. | 708/518 |
| 4,649,477 A | * | 3/1987 | MacGregor et al. ........ | 712/210 |
| 4,679,140 A | * | 7/1987 | Gotou et al. ................ | 712/229 |
| 4,812,971 A | * | 3/1989 | Butts et al. .................. | 712/210 |

FOREIGN PATENT DOCUMENTS

JP        6-250818        9/1994

* cited by examiner

*Primary Examiner*—Kenneth S Kim
(74) *Attorney, Agent, or Firm*—McDermott Will & Emery LLP

(57) ABSTRACT

An SZ (size information) section is provided for each of registers that make up a register file. Suppose an instruction decoded requests that operand data of a particular size be loaded from a RAM into the register file or that immediate operand data of a particular size be transferred to the register file. Then, the size information of the operand data will be retained in the SZ section. The instruction decoded may also be an arithmetic and logical operation instruction requesting that operand data in the register file be referred to or an instruction requesting that the operand data be stored from the register file into the RAM. In such a case, the size information will be read out from the SZ section of the register file and only parts of various components constituting manipulation means (like ALU), which have been specified by the size information, will be enabled. As a result, the power, which is usually dissipated by a processor handling data of multiple sizes, can be cut down effectively.

18 Claims, 2 Drawing Sheets

FIG. 2

(1) Group of Load Instructions
    (1.1) ldb   mem, Rn
    (1.2) ldbu  mem, Rn
    (1.3) ldh   mem, Rn
    (1.4) ldhu  mem, Rn
    (1.5) ld    mem, Rn
    (1.6) ldu   mem, Rn (2) Group of Resize Instructions
    (2.1) extb  Rn
    (2.2) exth  Rn
    (2.3) ext   Rn (3) Group of Signed/Unsigned Change Instructions
    (3.1) sgn   Rn
    (3.2) unsgn Rn (4) Group of Immediate Transfer Instructions
    (4.1) movb  imm8, Rn
    (4.2) movbu imm8, Rn
    (4.3) movh  imm16, Rn
    (4.4) movhu imm16, Rn
    (4.5) mov   imm32, Rn
    (4.6) movu  imm32, Rn (5) Group of Arithmetic and Logical Operation Instructions
    (5.1) add   Rm, Rn
    (5.2) sub   Rm, Rn
    (5.3) cmp   Rm, Rn
    (5.4) and   Rm, Rn
    (5.5) or    Rm, Rn (6) Group of Store Instructions
    (6.1) st    Rn, mem

PARTIAL ENABLING OF FUNCTIONAL UNIT BASED ON DATA AND SIZE PAIR IN REGISTER

BACKGROUND OF THE INVENTION

The present invention relates to a processor for processing data of multiple sizes.

A built-in processor now needs to process data of various sizes, e.g., 8-, 16- and 32-bit data, by itself. However, when applied to a mobile unit, a processor also needs to reduce its power dissipation as much as possible such that the processor can be driven for a longest possible time using a battery with a limited capacity.

A known RISC (reduced instruction set computer) processor with 32-bit architecture includes: a 32-bit arithmetic and logic unit (ALU) for performing arithmetic and logical operations on data; a 32-bit register file for retaining data therein; and a 32-bit bus for transferring data therethrough. In manipulating 8-bit data, the processor of this type extends the size of the data into 32 bits unconditionally. More specifically, if the 8-bit data in question is signed, then sign extension is carried out on the high-order 24 bits. Alternatively, if the 8-bit data is unsigned, then zero extension is carried out on the high-order 24 bits. Similarly, in manipulating 16-bit data, the processor of this type also extends the size of the data into 32 bits unconditionally. In the conventional processor, the 32-bit data obtained in this manner is provided to the 32-bit ALU and retained in the 32-bit register file or transferred through the 32-bit bus.

Even in performing a series of operations, like loading two 8-bit data elements from a memory, adding these data elements together and then storing 8-bit data representing the sum in the memory, the RISC processor should use all of its hardware resources, i.e., the 32-bit ALU, 32-bit register file and 32-bit bus. Thus, the processor dissipates power in vain. The same problem arises when the processor handles 16-bit data.

SUMMARY OF THE INVENTION

It is therefore an object of the present invention to cut down on the power dissipated wastefully by the multi-size data compliant processor.

To achieve this object, the inventive processor for handling data of multiple sizes is so constructed as to enable only a part of manipulation means that has a bit width corresponding to a maximum one of those sizes and that is associated with the data size of a specified operand. As used herein, the "manipulation means" is means for performing an operation, specified by an instruction, on an operand that has also been specified by the same instruction. The manipulation means includes: an ALU for performing arithmetic and logical operations on operand data; a register file for retaining the operand data therein; a bus for transferring the operand data therethrough; a driver for driving the bus; a latch for latching the operand data from the bus; and an extender for extending the size of the operand data. For example, by decoding a given instruction, size information about the data size of the operand specified by the instruction is obtained, thereby enabling only a part of the manipulation means that is specified by the size information.

To implement object-oriented architecture, operand data and size information about the size of the operand data are preferably retained in the register file. In this case, if a first instruction decoded requests that operand data of a particular size be written on the register file and if size information about the data size of the operand, specified by the first instruction, has been obtained, then not only the operand data but also the size information are retained in the register file. Alternatively, if a second instruction decoded requests that the operand data retained in the register file be referred to, then size information about the size of the operand data, as well as the operand data itself, are read out from the register file, thereby enabling only a part of the manipulation means that is specified by the size information read out from the register file.

According to another aspect of the present invention, the first instruction may also be an instruction specifying whether the operand data should be handled as signed data or unsigned data. The register file preferably retains the sign information representing whether the operand data is signed or unsigned, in addition to the operand data and the size information about the size of the operand data. In this case, if the sign information representing whether the operand, specified by the first instruction, is signed or unsigned is obtained in accordance with the first instruction decoded, then the register file retains not only the operand data but also the sign information. Alternatively, if the second instruction decoded requests that the operand data retained in the register file be referred to, then the sign information representing whether the operand data is signed or unsigned, as well as the operand data itself, are read out from the register file, and the manipulation means is controlled such that the second instruction is executed in accordance with the sign information read out.

BRIEF DESCRIPTION OF THE DRAWINGS

FIG. 2 illustrates parts of an instruction set for the processor shown in FIG. 1.

DETAILED DESCRIPTION OF THE INVENTION

Figure 1:
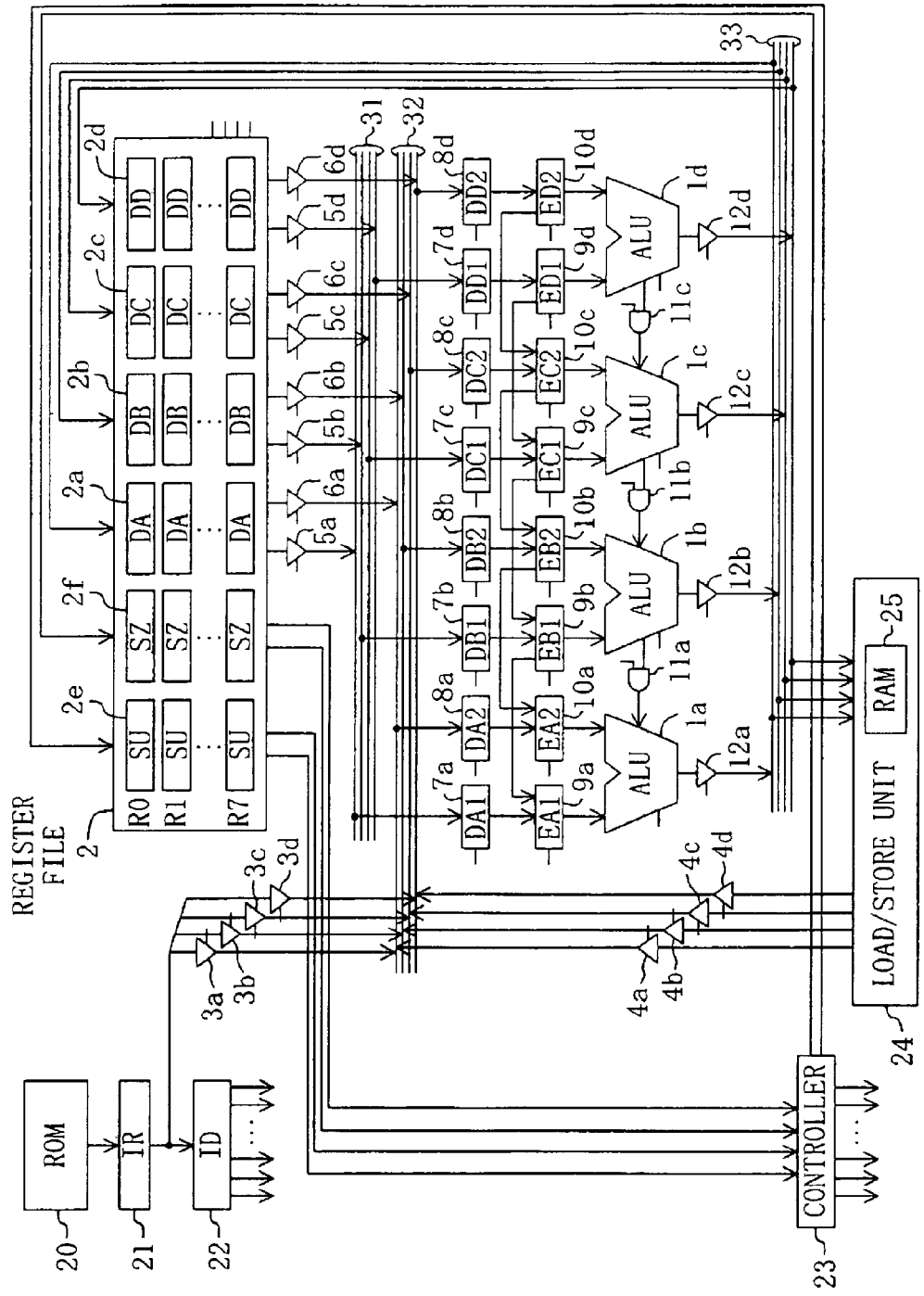
FIG. 1 is a block diagram illustrating an exemplary configuration for an inventive processor.

FIG. 1 illustrates an exemplary configuration for an inventive processor, which is a RISC processor with 32-bit architecture. The processor can handle data of three sizes, namely, 32-bit (1-word) data, 16-bit (half-word) data and 8-bit (1-byte) data.

The processor includes a 32-bit ALU for performing arithmetic and logical operations on data to obtain the results thereof and for generating flags. The 32-bit ALU is subdivided into four 8-bit ALUs 1a, 1b, 1c and 1d. Three gates 11a, 11b and 11c are provided for selectively conveying operation information about carries among these four 8-bit ALUs 1a through 1d. A ripple-carry 32-bit ALU is implementable when all of these four 8-bit ALUS 1a through 1d and all of these three gates 11a through 11c are enabled. A 16-bit ALU is implementable when only two 8-bit ALUs 1c and 1d and only one gate 11c are enabled. Also, just one ALU 1d may be enabled. A flag is generated at a bit position corresponding to the data size of an operand. It should be noted that the scripts a, b, c and d added to many of the reference numerals shown in FIG. 1 refer to bit positions covering most significant 8 bits, next most significant 8 bits, next least significant 8 bits and least significant 8 bits, respectively.

The processor further includes a 32-bit register file 2 consisting of eight registers R0 through R7. Each of these registers R0 through R7 includes: data A, B, C and D (DA, DB, DC and DD) sections 2a, 2b, 2c and 2d for retaining 8-bit data each; a sign information (SU) section 2e for retaining one-bit information representing whether the data is signed or unsigned; and a size information (SZ) section 2f for retaining two-bit information about the size of the data. That is to say, if the value of the one-bit information retained in the SU section 2e in a register is "1", then the data retained in the register should be handled as signed data. Conversely, if the value of the bit is "0", then the data retained in the register should be handled as unsigned data. Also, if the value of the two-bit information retained in the SZ section 2f in a register is "10", then 32-bit data is retained in total in the DA, DB, DC and DD sections 2a, 2b, 2c and 2d of the register. If the value of the two bits is "01", then 16-bit data is retained in total in only the DC and DD sections 2c and 2d of the register. And if the value of the two bits is "00", then 8-bit data is retained in just the DD section 2d of the register.

The processor further includes: 32-bit A, B and C buses 31, 32 and 33 for transferring data therethrough; a read-only memory (ROM) 20 for storing instructions to be executed therein; an instruction register (IR) 21 for retaining individual instructions read out from the ROM 20; a load/store unit 24; and a random access memory (RAM) 25 for storing data therein.

Immediate operand data, obtained from the instruction register 21, is provided to 8-bit drivers 3a, 3b, 3c and 3d for driving the B bus 32. Specifically, if 32-bit immediate operand data should be provided to the B bus 32, all of the drivers 3a through 3d are enabled. Alternatively, if 16-bit immediate operand data should be provided to the B bus 32, only the drivers 3c and 3d are enabled. And if 8-bit immediate operand data should be provided to the B bus 32, just the driver 3d is enabled.

Load data, read out by the load/store unit 24 from the RAM 25, is provided to 8-bit drivers 4a, 4b, 4c and 4d for driving the B bus 32. Specifically, if 32-bit load data should be provided to the B bus 32, all of the drivers 4a through 4d are enabled. Alternatively, if 16-bit load data should be provided to the B bus 32, only the drivers 4c and 4d are enabled. And if 8-bit load data should be provided to the B bus 32, just the driver 4d is enabled.

A first data element, read out from the register file 2, is provided to 8-bit drivers 5a, 5b, 5c and 5d for driving the A bus 31. Specifically, if 32-bit data, read out from the DA, DB, DC and DD sections 2a, 2b, 2c and 2d, should be provided to the A bus 31, all of the drivers 5a through 5d are enabled. Alternatively, if 16-bit data, read out from the DC and DD sections 2c and 2d, should be provided to the A bus 31, only the drivers 5c and 5d are enabled. And if 8-bit data, read out from the DD section 2d, should be provided to the A bus 31, just the driver 5d is enabled.

A second data element, read out from the register file 2, is provided to 8-bit drivers 6a, 6b, 6c and 6d for driving the B bus 32. Specifically, if 32-bit data, read out from the DA, DB, DC and DD sections 2a, 2b, 2c and 2d, should be provided to the B bus 32, all of the drivers 6a through 6d are enabled. Alternatively, if 16-bit data, read out from the DC and DD sections 2c and 2d, should be provided to the B bus 32, only the drivers 6c and 6d are enabled. And if 8-bit data, read out from the DD section 2d, should be provided to the B bus 32, just the driver 6d is enabled.

The processor further includes a set of 8-bit latches (DA1, DB1, DC1 and DD1) 7a, 7b, 7c and 7d for latching data on the A bus 31. If the data to be latched has a size of 32 bits, then all of these latches 7a through 7d are enabled. Alternatively, if the data to be latched has a size of 16 bits, then only the latches 7c and 7d are enabled. And if the data to be latched has a size of 8 bits, then just the latch 7d is enabled.

The processor further includes another set of 8-bit latches (DA2, DB2, DC2 and DD2) 8a, 8b, 8c and 8d for latching data on the B bus 32. If the data to be latched has a size of 32 bits, then all of these latches 8a through 8d are enabled. Alternatively, if the data to be latched has a size of 16 bits, then only the latches 8c and 8d are enabled. And if the data to be latched has a size of 8 bits, then just the latch 8d is enabled.

The processor further includes a 32-bit extender for extending the size of the data latched in the latches 7a through 7d and providing resultant data to the left-hand-side inputs of the ALUs 1a through 1d, respectively. The 32-bit extender is subdivided into four 8-bit extenders (EA1, EB1, EC1 and ED1) 9a, 9b, 9c and 9d. An extender for extending the size of 8- or 16-bit data into 32 bits is implementable when all of these four 8-bit extenders 9a through 9d are enabled. An extender for extending the size of 8-bit data into 16 bits is implementable when only the two 8-bit extenders 9c and 9d are enabled. If the data to have its size extended is signed, then sign extension is carried out. Conversely, if the data to have its size extended is unsigned, then zero extension is carried out.

The processor further includes a 32-bit extender for extending the size of the data latched in the latches 8a through 8d and providing resultant data to the right-hand-side inputs of the ALUs 1a through 1d, respectively. The 32-bit extender is subdivided into four 8-bit extenders (EA2, EB2, EC2 and ED2) 10a, 10b, 10c and 10d. An extender for extending the size of 8- or 16-bit data into 32 bits is implementable when all of these four 8-bit extenders 10a through 10d are enabled. An extender for extending the size of 8-bit data into 16 bits is implementable when only the two 8-bit extenders 10c and 10d are enabled. If the data to have its size extended is signed, then sign extension is carried out. Conversely, if the data to have its size extended is unsigned, then zero extension is carried out.

The data representing the operation results of the ALUs 1a through 1d is provided to 8-bit drivers 12a, 12b, 12c and 12d for driving the C bus 33, respectively. If 32-bit data should be provided to the C bus 33, then all of these drivers 12a through 12d are enabled. Alternatively, if 16-bit data should be provided to the C bus 33, then only the drivers 12c and 12d are enabled. And if 8-bit data should be provided to the C bus 33, then just the driver 12d is enabled. The data that will be retained in the register file 2 is provided through the C bus 33. Also, the data that will be stored in the RAM 25 is provided through the C bus 33 to the load/store unit 24.

The processor further includes: an instruction decoder (ID) 22 for decoding the individual instructions given from the instruction register 21; and a controller 23 for taking control of writing or reading information onto/from the Su and SZ sections 2e and 2f. The instruction decoder 22 controls various components that make up the manipulation means shown in FIG. 1. For example, the instruction decoder 22 selectively turns ON/OFF the drivers 3a through 3d and 4a through 4d. The controller 23 also controls the number of components enabled in the manipulation means shown in FIG. 1 in accordance with the information retained in the SU and SZ sections 2e and 2f.

FIG. 2 illustrates parts of an instruction set for the inventive processor. The processor is so constructed as to execute a group of load instructions, resize instructions, signed/unsigned change instructions, immediate transfer instructions, arithmetic and logical operation instructions, store instructions, branch instructions, etc. The illustration of branch instructions and so on is omitted from FIG. 2. In FIG. 2, each of Rn and Rm represents any of the registers R0 through R7. Each of the registers R0 through R7 is defined as a 32-bit register for a programmer, but the SU and SZ sections 2e and 2f are invisible to the programmer.

(1) Group of Load Instructions

A group of load instructions includes the following six instructions. The operation code field of each instruction includes information specifying whether an operand is signed or unsigned and information specifying the data size of the operand. In any instruction, the processor has its operation controlled by the instruction decoder 22.

(1.1) ldb mem, Rn

This is an instruction requesting that 8-bit data be loaded from a memory mem and written as signed data on a register Rn. When this instruction is decoded, the load/store unit 24 reads out 8-bit operand data from the RAM 25. The read data passes through the driver 4d and a part of the B bus 32 corresponding to the least significant 8 bits (hereinafter, simply referred to as "LS 8-bit part") in this order so as to be latched in the latch 8d. Next, the latched data is just passed through the extender 10d and the ALU 1d to the driver 12d and then stored in the DD section 2d of the register Rn via the LS 8-bit part of the C bus 33. Concurrently, a value "1" representing retention of signed data is stored in the SU section 2e of the register Rn and a value "00" representing retention of 8-bit data is stored in the SZ section 2f thereof. In the meantime, none of the other drivers are enabled and the other latches and registers keep retaining their current data.

(1.2) ldbu mem, Rn

This is an instruction requesting that 8-bit data be loaded from a memory mem and written as unsigned data on a register Rn. When this instruction is decoded, the processor operates in the same manner as in (1.1) except that a value "0" representing retention of unsigned data is stored in the SU section 2e of the register Rn.

(1.3) ldh mem, Rn

This is an instruction requesting that 16-bit data be loaded from a memory mem and written as signed data on a register Rn. When this instruction is decoded, the load/store unit 24 reads out 16-bit operand data from the RAM 25. The read data passes through the drivers 4c and 4d and an LS 16-bit part of the B bus 32 in this order so as to be latched in the latches 8c and 8d. Next, the latched data is just passed through the extenders 10c and 10d and the ALUs 1c and 1d to the drivers 12c and 12d and then stored in the DC and DD sections 2c and 2d of the register Rn via the LS 16-bit part of the C bus 33. Concurrently, a value "1" representing retention of signed data is stored in the SU section 2e of the register Rn and a value "01" representing retention of 16-bit data is stored in the SZ section 2f thereof. In the meantime, none of the other drivers are enabled and the other latches and registers keep retaining their current data.

(1.4) ldhu mem, Rn

This is an instruction requesting that 16-bit data be loaded from a memory mem and written as unsigned data on a register Rn. When this instruction is decoded, the processor operates in the same manner as in (1.3) except that a value "0" representing retention of unsigned data is stored in the SU section 2e of the register Rn.

(1.5) ld mem, Rn

This is an instruction requesting that 32-bit data be loaded from a memory mem and written as signed data on a register Rn. When this instruction is decoded, the load/store unit 24 reads out 32-bit operand data from the RAM 25. The read data passes through the drivers 4a through 4d and the entire B bus 32 in this order so as to be latched in the latches 8a through 8d. Next, the latched data is just passed through the extenders 10a through 10d and the ALUs 1a through 1d to the drivers 12a through 12d and then stored in the DA, DB, DC and DD sections 2a through 2d of the register Rn via the entire C bus 33. Concurrently, a value "1" representing retention of signed data is stored in the SU section 2e of the register Rn and a value "10" representing retention of 32-bit data is stored in the SZ section 2f thereof. In the meantime, none of the other drivers are enabled and the other latches and registers keep retaining their current data.

(1.6) ldu mem, Rn

This is an instruction requesting that 32-bit data be loaded from a memory mem and written as unsigned data on a register Rn. When this instruction is decoded, the processor operates in the same manner as in (1.5) except that a value "0" representing retention of unsigned data is stored in the SU section 2e of the register Rn.

(2) Group of Resize Instructions

A group of resize instructions includes the following three instructions. The operation code field of each instruction includes information specifying the data size of the operand, but does not include any information about whether the operand is signed or unsigned. In any instruction, the processor has its operation controlled by the instruction decoder 22 and the controller 23.

(2.1) extb Rn

This is an instruction requesting that data retained in a register Rn (Rn data) be resized into 8 bits. When this instruction is decoded, the bits retained in the SU and SZ sections 2e and 2f of the register Rn are provided to the controller 23. Subsequent operations are different depending on the bits in the SZ section 2f, or the size of the Rn data.

(i) If the Rn data is 8-bit data, then no operations are performed. That is to say, none of the drivers are enabled and all of the latches and registers keep retaining their current data.

(ii) If the Rn data is 16-bit data, then the value in the SZ section 2f of the register Rn is changed from "01" representing retention of 16-bit data into "00" representing retention of 8-bit data. However, the value in the SU section 2e of the register Rn is not changed. In this manner, the 16-bit data retained in the register Rn has its high-order 8 bits nullified while being kept signed or unsigned. None of the drivers are enabled and all of the latches and the other registers keep retaining their current data.

(iii) If the Rn data is 32-bit data, then value in the SZ section 2f of the register Rn is changed from "10" representing retention of 32-bit data into "00" representing retention of 8-bit data. However, the value in the SU section 2e of the register Rn is not changed. In this manner, the 32-bit data retained in the register Rn has its high-order 24 bits nullified while being kept signed or unsigned. None of the drivers are enabled and all of the latches and the other registers keep retaining their current data.

(2.2) exth Rn

This is an instruction requesting that Rn data be resized into 16 bits. When this instruction is decoded, the bits retained in the SU and SZ sections 2e and 2f of the register Rn are provided to the controller 23. Subsequent operations are different depending on the bits in the SU and SZ sections 2e and 2f, i.e., whether the Rn data is signed or unsigned and what is the size of the Rn data.

(i) If the Rn data is 8-bit data, then the size of the data is extended. Specifically, 8-bit operand data is read out from the DD section 2d of the register Rn, passed through the driver 6d and the LS 8-bit part of the B bus 32 and then latched in the latch 8d. Next, the 8-bit data latched in the latch 8d has its size extended by the extenders 10c and 10d into 16 bits. More specifically, if the 8-bit data retained in the register Rn is signed data, then sign extension is carried out on the high-order 8 bits. Alternatively, if the 8-bit data retained in the register Rn is unsigned data, then zero extension is carried out on the high-order 8 bits. The 16-bit data, obtained by this size extension, is just passed through the ALUs 1c and 1d to the drivers 12c and 12d and then stored in the DC and DD sections 2c and 2d of the register Rn via the LS 16-bit part of the C bus 33. Concurrently, the value in the SZ section 2f of the register Rn is changed from "00" representing retention of 8-bit data into "01" representing retention of 16-bit data. However, the value in the SU section 2e of the register Rn is not changed. In this manner, the data retained in the register Rn has its size extended from 8 bits into 16 bits while being kept signed or unsigned. None of the other drivers are enabled and all the other latches and registers keep retaining their current data.

(ii) If the Rn data is 16-bit data, then no operations are performed. That is to say, none of the drivers are enabled and all of the latches and registers keep retaining their current data.

(iii) If the Rn data is 32-bit data, then the value in the SZ section 2f of the register Rn is changed from "10" representing retention of 32-bit data into "01" representing retention of 16-bit data. However, the value in the SU section 2e of the register Rn is not changed. In this manner, the 32-bit data retained in the register Rn has its high-order 16 bits nullified while being kept signed or unsigned. None of the drivers are enabled and all of the latches and the other registers keep retaining their current data.

(2.3) ext Rn

This is an instruction requesting that Rn data be resized into 32 bits. When this instruction is decoded, the bits retained in the SU and SZ sections 2e and 2f of the register Rn are provided to the controller 23. Subsequent operations are different depending on the bits in the SU and SZ sections 2e and 2f, i.e., whether the Rn data is signed or unsigned and what is the size of the Rn data.

(i) If the Rn data is 8-bit data, then the size of the data is extended. Specifically, 8-bit operand data is read out from the DD section 2d of the register Rn, passed through the driver 6d and the LS 8-bit part of the B bus 32 and then latched in the latch 8d. Next, the 8-bit data latched in the latch 8d has its size extended by the extenders 10a through 10d into 32 bits. More specifically, if the 8-bit data retained in the register Rn is signed data, then sign extension is carried out on the high-order 24 bits. Alternatively, if the 8-bit data retained in the register Rn is unsigned data, then zero extension is carried out on the high-order 24 bits. The 32-bit data, obtained by this size extension, is just passed through the ALUs 1a through 1d to the drivers 12a through 12d and then stored in the DA, DB, DC and DD sections 2a through 2d of the register Rn by way of the entire C bus 33. Concurrently, the value in the SZ section 2f of the register Rn is changed from "00" representing retention of 8-bit data into "10" representing retention of 32-bit data. However, the value in the SU section 2e of the register Rn is not changed. In this manner, the data retained in the register Rn has its size extended from 8 bits into 32 bits while being kept signed or unsigned. None of the other drivers are enabled and all the other latches and registers keep retaining their current data.

(ii) If the Rn data is 16-bit data, then the size of the data is extended. Specifically, 16-bit operand data is read out from the DC and DD sections 2c and 2d of the register Rn, passed through the drivers 6c and 6d and the LS 16-bit part of the B bus 32 and then latched in the latches 8c and 8d. Next, the 16-bit data latched in the latches 8c and 8d has its size extended by the extenders 10a through 10d into 32 bits. Subsequently, the processor operates in the same way as in the case (i) where the Rn data is 8-bit data.

(iii) If the Rn data is 32-bit data, then no operations are performed. That is to say, none of the drivers are enabled and all of the latches and registers keep retaining their current data.

(3) Group of Signed/Unsigned Change Instructions

A group of signed/unsigned change instructions includes the following two instructions. The operation code field of each instruction includes information specifying whether the operand is signed or unsigned, but does not include any information about the data size of the operand. In any instruction, the processor has its operation controlled by the instruction decoder 22.

(3.1) sgn Rn

This is an instruction requesting that data retained in a register Rn (Rn data) be changed into signed data. When this instruction is decoded, a value "1" representing retention of signed data is stored in the SU section 2e of the register Rn. However, the value in the SZ section 2f of the register Rn is not changed. In this manner, unsigned data, which has been retained in the register Rn, will be handled as signed data while maintaining its data size. None of the drivers are enabled and all of the latches and the other registers keep retaining their current data.

(3.2) unsgn Rn

This is an instruction requesting that Rn data be changed into unsigned data. When this instruction is decoded, a value "0" representing retention of unsigned data is stored in the SU section 2e of the register Rn. However, the value in the SZ section 2f of the register Rn is not changed. In this manner, signed data, which has been retained in the register Rn, will be handled as unsigned data while maintaining its data size. None of the drivers are enabled and all of the latches and the other registers keep retaining their current data.

(4) Group of Immediate Transfer Instructions

A group of immediate transfer instructions includes the following six instructions. The operation code field of each instruction includes information specifying whether an operand is signed or unsigned and information specifying the data size of the operand. In any instruction, the processor has its operation controlled by the instruction decoder 22.

(4.1) movb imm8, Rn

This is an instruction requesting that 8-bit immediate data imm8, specified by the operand field, be transferred as signed data to a register Rn. When this instruction is decoded, the 8-bit immediate data is read out from the instruction register 21. The read data passes through the driver 3d and an LS 8-bit part Of the B bus 32 so as to be latched in the latch 8d. Next, the latched data is just passed through the extender 10d and the ALU 1d to the driver 12b and then stored in the DD section 2d of the register Rn via the LS 8-bit part of the C bus 33. Concurrently, a value "1" representing retention of signed data is stored in the SU section 2e of the register Rn and a value "00" representing retention of 8-bit data is stored in the SZ section 2f thereof. In the meantime, none of the other drivers are enabled and the other latches and registers keep retaining their current data.

(4.2) movbu imm8, Rn

This is an instruction requesting that 8-bit immediate data imm8, specified by the operand field, be transferred as unsigned data to a register Rn. When this instruction is decoded, the processor operates in the same manner as in (4.1) except that a value "0" representing retention of unsigned data is stored in the SU section 2e of the register Rn.

(4.3) movh imm16, Rn

This is an instruction requesting that 16-bit immediate data imm16, specified by the operand field, be transferred as signed data to a register Rn. When this instruction is decoded, 16-bit immediate data is read out from the instruction register 21. The read data passes through the drivers 3c and 3d and an LS 16-bit part of the B bus 32 so as to be latched in the latches 8c and 8d. Next, the latched data is just passed through the extenders 10c and 10d and the ALUs 1c and 1d to the drivers 12c and 12d and then stored in the DC and DD sections 2c and 2d of the register Rn via the LS 16-bit part of the C bus 33. Concurrently, a value "1" representing retention of signed data is stored in the SU section 2e of the register Rn and a value "01" representing retention of 16-bit data is stored in the SZ section 2f thereof. In the meantime, none of the other drivers are enabled and the other latches and registers keep retaining their current data.

(4.4) movhu imm16, Rn

This is an instruction requesting that 16-bit immediate data imm16, specified by the operand field, be transferred as unsigned data to a register Rn. When this instruction is decoded, the processor operates in the same manner as in (4.3) except that a value "0" representing retention of unsigned data is stored in the SU section 2e of the register Rn.

(4.5) mov imm32, Rn

This is an instruction requesting that 32-bit immediate data imm32, specified by the operand field, be transferred as signed data to a register Rn. When this instruction is decoded, 32-bit immediate data is read out from the instruction register 21. The read data passes through the drivers 3a through 3d and the entire B bus 32 so as to be latched in the latches 8a through 8d. Next, the latched data is just passed through the extenders 10a through 10d and the ALUs 1a through 1d to the drivers 12a through 12d and then stored in the DA, DB, DC and DD sections 2a through 2d of the register Rn via the entire C bus 33. Concurrently, a value "1" representing retention of signed data is stored in the SU section 2e of the register Rn and a value "10" representing retention of 32-bit data is stored in the SZ section 2f thereof. In the meantime, none of the other drivers are enabled and the other latches and registers keep retaining their current data.

(4.6) movu imm32, Rn

This is an instruction requesting that 32-bit immediate data imm32, specified by the operand field, be transferred as unsigned data to a register Rn. When this instruction is decoded, the processor operates in the same manner as in (4.5) except that a value "0" representing retention of unsigned data is stored in the SU section 2e of the register Rn.

(5) Group of Arithmetic and Logical Operation Instructions

A group of arithmetic and logical operation instructions includes the following five register-to-register operation instructions. The operation code field of each instruction includes neither the information specifying the data size of the operand nor the information specifying whether the operand is signed or unsigned. In the illustrated example, the two-operand format is adopted and operations and flag generation are both carried out depending on the data size of the destination operand. In any instruction, the processor has its operation controlled by the instruction decoder 22 and the controller 23.

(5.1) add Rm, Rn

This is an instruction requesting that data retained in a register Rm (Rm data) and data retained in a register Rn (Rn data) be added up and that the sum be stored in the register Rn. When this instruction is decoded, the bits stored in the SU and SZ sections 2e and 2f of the respective registers Rm and Rn are provided to the controller 23.

First, it will be described how to transfer the Rm data. If the Rm data is 8-bit data, 8-bit operand data is read out from the DD section 2d of the register Rm and then passed through the driver 6d and an LS 8-bit part of the B bus 32 so as to be latched in the latch 8d. Alternatively, if the Rm data is 16-bit data, 16-bit operand data is read out from the DC and DD sections 2c and 2d of the register Rm and then passed through the drivers 6c and 6d and an LS 16-bit part of the B bus 32 so as to be latched in the latches 8c and 8d. And if the Rm data is 32-bit data, 32-bit operand data is read out from the DA, DB, DC and DD sections 2a through 2d of the register Rm and then passed through the drivers 6a through 6d and the entire B bus 32 so as to be latched in the latches 8a through 8d.

Next, it will be described how to transfer the Rn data. If the Rn data is 8-bit data, 8-bit operand data is read out from the DD section 2d of the register Rn and then passed through the driver 5d and an LS 8-bit part of the A bus 31 so as to be latched in the latch 7d. Alternatively, if the Rn data is 16-bit data, 16-bit operand data is read out from the DC and DD sections 2c and 2d of the register Rn and then passed through the drivers 5c and 5d and an LS 16-bit part of the A bus 31 so as to be latched in the latches 7c and 7d. And if the Rn data is 32-bit data, 32-bit operand data is read out from the DA, DB, DC and DD sections 2a through 2d of the register Rn and then passed through the drivers 5a through 5d and the entire A bus 31 so as to be latched in the latches 7a through 7d.

The Rn data, retained in the latches 7a through 7d, is just passed through the extenders 9a through 9d to the left-hand-side inputs of the ALUs 1a through 1d. If the Rn data is greater in size than the Rm data, then the Rm data, retained in the latches 8a through 8d, has its size extended by the extenders 10a through 10d up to the size of the Rn data and then provided to the right-hand-side inputs of the ALUs 1a through 1d. Otherwise, the Rm data is just passed through the extenders 10a through 10d to the right-hand-side inputs of the ALUs 1a through 1d. When the size of the Rm data is extended, the type of the extension is selected in accordance with the value representing whether the Rm data is signed or unsigned. Specifically, if the value is "1", then sign extension is carried out. Alternatively, if the value is "0", then zero extension is carried out.

The ALUs 1a through 1d and the gates 11a through 11c are selectively enabled depending on the size of the Rn data. Specifically, if the Rn data is 8-bit data, then just the ALU 1d is enabled to obtain an 8-bit sum and flags. If the Rn data is 16-bit data, then only the ALUs 1c and 1d and the gate 11c are enabled to obtain a 16-bit sum and flags. And if the Rn data is 32-bit data, then all of the ALUs 1a through 1d and the gates 11a through 11c are enabled to obtain a 32-bit sum and flags. Flags are generated at a bit position corresponding to the size of the Rn data and in accordance with the value representing whether the Rn data is signed or unsigned.

Storing the sum in the register file 2 also depends on the size of the Rn data. Specifically, if the Rn data is 8-bit data, the 8-bit sum is provided to the driver 12d, passed through the LS 8-bit part of the C bus 33 and then stored in the DD section 2d of the register Rn. If the Rn data is 16-bit data, the 16-bit sum is provided to the drivers 12c and 12d, passed through the LS 16-bit part of the C bus 33 and then stored in the DC and DD sections 2c and 2d of the register Rn. And if the Rn data is 32-bit data, the 32-bit sum is provided to the drivers 12a through 12d, passed through the entire C bus 33 and then stored in the DA, DB, DC and DD sections 2a through 2d of the register Rn. In the meantime, none of the other drivers are enabled and the other latches and registers keep retaining their current data.

(5.2) sub Rm, Rn

This is an instruction requesting that Rn data be subtracted from Rm data and that the remainder be stored in the register Rn. When this instruction is decoded, the processor operates in the same way as in (5.1) except that subtraction is carried out by the ALUs 1a through 1d.

(5.3) cmp Rm, Rn

This is an instruction requesting that Rm data be compared to Rn data. When this instruction is decoded, the processor operates in the same way as in (5.1) except that subtraction is carried out by the ALUs 1a through 1d and that none of the drivers 12a through 12d drives the C bus 33 and that the DA, DB, DC and DD sections 2a through 2d of the register Rn are not updated.

(5.4) and Rm, Rn

This is an instruction requesting that the AND of Rm and Rn data be stored in the register Rn. When this instruction is decoded, the processor operates in the same way as in (5.1) except that AND operation is carried out by the ALUs 1a through 1d.

(5.5) or Rm, Rn

This is an instruction requesting that the OR of Rm and Rn data be stored in the register Rn. When this instruction is decoded, the processor operates in the same way as in (5.1) except that OR operation is carried out by the ALUs 1a through 1d.

(6) A Group of Store Instructions

A group of store instructions includes the following one instruction. The operation code field of the instruction includes neither the information specifying the data size of the operand nor the information specifying whether the operand is signed or unsigned. The processor has its operation controlled by the instruction decoder 22 and the controller 23.

(6.1) st Rn, mem

This is an instruction requesting that data retained in a register Rn (Rn data) be stored in a memory mem. Storing the Rn data in the memory depends on the size of the Rn data. When this instruction is decoded, the bits in the SU and SZ sections 2e and 2f of the register Rn are provided to the controller 23. If the Rn data is 8-bit data, 8-bit operand data is read out from the DD section 2d of the register Rn and then passed through the driver 6d and an LS 8-bit part of the B bus 32 so as to be latched in the latch 8d. Thereafter, the latched data is just passed through the extender 10d and the ALU 1d to the driver 12d and then stored in the RAM 25 by way of the LS 8-bit part of the C bus 33. Alternatively, if the Rn data is 16-bit data, 16-bit operand data is read out from the DC and DD sections 2c and 2d of the register Rn and then passed through the drivers 6c and 6d and an LS 16-bit part of the B bus 32 so as to be latched in the latches 8c and 8d. Thereafter, the latched data is just passed through the extenders 10c and 10d and the ALUs 1c and 1d to the drivers 12c and 12d and then stored in the RAM 25 by way of the LS 16-bit part of the C bus 33. And if the Rn data is 32-bit data, 32-bit operand data is read out from the DA, DB, DC and DD sections 2a through 2d of the register Rn and then passed through the drivers 6a through 6d and the entire B bus 32 so as to be latched in the latches 8a through 8d. Thereafter, the latched data is just passed through the extenders 10a through 10d and the ALUS 1a through 1d to the drivers 12a through 12d and then stored in the RAM 25 by way of the entire C bus 33. In the meantime, none of the other drivers are enabled and the other latches and registers keep retaining their current data.

All of the instruction groups shown in FIG. 2 have been described. Next, it will be described how the processor shown in FIG. 1 operates in executing a program requesting that two 8-bit data elements be loaded successively from a memory and added together and that 8-bit data representing the sum be stored in the memory. That is to say, the program includes the following four instructions:

Instruction 1: ldb mem, R0;

Instruction 2: ldb mem, R1;

Instruction 3: add R1, R0; and

Instruction 4: st R0, mem

First, in accordance with Instruction 1, 8-bit data is loaded from the RAM 25 and written as signed data on the DD section 2d of the register R0. In the SZ section 2f of the register R0, a value "00" representing retention of 8-bit data is stored. Next, in accordance with Instruction 2, another 8-bit data is loaded from the RAM 25 and written as signed data on the DD section 2d of the register R1. In the SZ section 2f of the register R1, a value "00" representing retention of 8-bit data is also stored. Subsequently, in accordance with Instruction 3, the 8-bit R0 and R1 data elements are added together by reference to the respective SZ sections 2f of the registers R0 and R1 and 8-bit data representing the sum is stored in the register R0. In this case, the R0 data is just passed through the extender 9d to the left-hand-side input of the ALU 1d. On the other hand, the R1 data is just passed through the extender 10d to the right-hand-side input of the ALU 1d. Then, the ALU 1d adds these 8-bit data elements together and the sum is stored in the DD section 2d of the register R0. Finally, in accordance with Instruction 4, the 8-bit sum, retained in the register R0, is stored in the RAM 25 by reference to the SZ section 2f of the register R0.

While the processor is performing this series of operations, the ALUs 1a through 1c, DA, DB and DC sections 2a through 2c of the registers R0 and R1, drivers 4a through 4c, 5a through 5c and 6a through 6c, latches 7a through 7c and 8a through 8c, extenders 9a through 9c and 10a through 10c, gates 11a through 11c, drivers 12a through 12c and respective high-order 24-bit parts of the A, B and C buses 31, 32 and 33 are not used at all. As a result, power is dissipated much less wastefully. The same effects are also attainable if Instruction 1 (i.e., load instruction) in this program is replaced with an immediate transfer instruction. The power dissipation can also be cut down effectively even when the processor shown in FIG. 1 handles 16-bit data.

In addition, the processor shown in FIG. 1 provides the SZ section 2f for each of the eight registers R0 through R7 of which the register file 2 is made up. An instruction decoded may request that operand data of a particular size be loaded from the RAM 25 into the register file 2 or that immediate operand data of a particular size be transferred to the register file 2. In such a case, the size information of the operand data will be retained in the SZ section 2f. An instruction decoded may also be an arithmetic and logical operation instruction requesting that the operand data in the register file 2 be referred to or an instruction requesting that the operand data be stored from the register file 2 into the RAM 25. In such a case, the size information will be read out from the SZ section 2f of the register file 2 and only parts of the various components constituting the manipulation means, which have been specified by the size information, are enabled. Thus, the power dissipation can be cut down effectively by taking advantage of conventional program resources and without increasing the number of instructions.

It should be noted that the present invention is broadly applicable to any processor that handles data of multiple sizes. That is to say, the present invention is not limited to the RISC processor exemplified above, but may find its application in a CISC (complex instruction set computer) processor as well. Also, the present invention is modifiable in the following manners.

(a) In describing the group of arithmetic and logical operation instructions, the operations and flag generation are both supposed to depend on the data size of the destination operand. Alternatively, the operations and flag generation may also depend on either one of the source and destination operands that is greater in size.

(b) In the foregoing embodiment, the arithmetic and logical operation instructions are described in the two-operand format, but may be described in the three-operand format instead. In such a case, the data size of the destination operand preferably depends on one of the two source operands that is greater in size.

(c) The register file, latch, extender, ALU, driver and bus are all controlled by subdividing each of these into four parts corresponding to the most significant 8 bits, next most significant 8 bits, next least significant 8 bits and least significant 8 bits, respectively. Optionally, control may be carried out on the three units of: most significant 16 bits; intermediate 8 bits; and least significant 8 bits by combining the most and next most significant 8 bits together.

(d) Data is supposed to have one of the three sizes of 8, 16 and 32 bits. If necessary, another data size of 24 bits may be added to use four data sizes in total. Then, the configuration shown in FIG. 1, where the register file, latch, extender, ALU, driver and bus are all controlled by subdividing each of these into four parts corresponding to the most significant, next most significant, next least significant and least significant 8 bits, can be used more effectively.

(e) As another alternative, data may also have the four sizes of 8, 16, 32 and 64 bits. In such a case, the bit width of the register file, latch, extender, ALU, driver and bus may be extended into 64 bits and these components may be controlled by subdividing each of these into four parts corresponding to most significant 32 bits, next most significant 16 bits, next least significant 8 bits and least significant 8 bits, respectively.

(f) The data size does not have to be a multiple of 8 bits. Alternatively, a system for detecting the effective size of operand data may be provided at any location on the path leading from the output of the ALU to the input of the register file 2. And the effective size detected may be retained in the SZ section 2f. For example, 32-bit unsigned data might actually have most significant 28 zero-valued bits. In such a case, size information representing retention of 4-bit data may be retained in the SZ section 2f, and only parts of the various components constituting the manipulation means, which correspond to the least significant 4 bits, may be enabled in accordance with the size information.

(g) The SU and SZ sections 2e and 2f may be omitted from the register file 2. In such a case, a size/sign detector may be provided to read out two 32-bit data words from the register file 2 and to know the effective sizes of these data words and whether these data words are signed or unsigned in executing an arithmetic and logical operation instruction. The size/sign detector may perform bit search by beginning with the most significant bit of each data word, thereby locating a position of the first "1" bit. And the detector may regard the greater weight of the position as effective size and input the size to the controller 23. Also, if the detector has found as a result of the bit search that the most significant bit is "1", then the detector may input information "signed" to the controller 23. On the other hand, if the detector has found otherwise, then the detector may input information "unsigned" to the controller 23. By performing this series of operations, the same signals as those exemplified above are input to the controller 23 and the subsequent operations will be performed in the same way. It should be noted, however, that the manipulation means such as the ALU may have its width divided on a bit-by-bit basis. Alternatively, the width may also be divided on the basis of four bits, not bit-by-bit basis. This unit would be more efficient because there is no need to make the size/sign detector perform bit search and the logical operations need to be carried out on the four-bit basis.

(h) To cope with multitasking, the SU and SZ sections 2e and 2f may be added to a context block and migrated or returned when tasks are switched.

What is claimed is:

1. A processor for handling data of multiple sizes, the processor comprising:

manipulation means for performing a manipulation on an operand, the manipulation and the operand both being specified by an instruction, the manipulation means having a bit width corresponding to a maximum one of the multiple sizes; and manipulation control means for enabling only a part of the manipulation means that is associated with a data size of the specified operand, wherein the manipulation control means decodes the instruction, thereby obtaining size information about the data size of the operand that has been specified by the instruction and enabling only a part of the manipulation means that is specified by the size information, wherein the manipulation means comprises register means for retaining operand data and size information about the size of the operand data, the operand data and the size information are retained in pairs, in the register means, wherein if the manipulation control means has decoded a first instruction requesting that operand data of a particular size be written on the register means and has obtained size information about the data size of the operand specified by the first instruction, then the manipulation control means makes the register means retain not only the operand data but also the size information, and wherein if the manipulation control means has decoded a second instruction requesting that the operand data retained in the register means be referred to, then the manipulation control means reads out size information about the size of the operand data, as well as the operand data itself, from the register means, and enables only a part of the manipulation means that is specified by the size information read out from the register means.

2. The processor of claim 1, wherein the manipulation means comprises arithmetic and logical operation means for performing arithmetic and logical operations on operand data, the operation means having the bit width corresponding to the maximum size, and wherein only a part of the operation means that is associated with the data size of the specified operand is enabled.

3. The processor of claim 2, wherein the manipulation means further comprises means for conveying operation information among respective components of the arithmetic and logical operation means, and wherein only a part of the conveying means that is associated with the data size of the specified operand is enabled.

4. The processor of claim 3, wherein the operation information conveyed by the conveying means is information about carries.

5. The processor of claim 1, which is a RISC type.

6. The processor of claim 1, wherein the manipulation means comprises:

bus means for transferring operand data therethrough, the bus means having the bit width corresponding to the maximum size; and driver means for driving the bus means, the driver means also having the bit width corresponding to the maximum size, and wherein only a part of the driver means that is associated with the data size of the specified operand is enabled.

7. The processor of claim 1, wherein the manipulation means comprises:

bus means for transferring operand data therethrough, the bus means having the bit width corresponding to the maximum size; and latch means for latching the operand data on the bus means, the latch means also having the bit width corresponding to the maximum size, and wherein only a part of the latch means that is associated with the data size of the specified operand is enabled.

8. The processor of claim 1, wherein the manipulation means comprises extension means for extending the size of operand data, the extension means having the bit width corresponding to the maximum size, and wherein only a part of the extension means that is associated with the data size of the specified operand is enabled.

9. The processor of claim 1, wherein the first instruction includes an operation code field that contains sign information specifying whether operand data should be handled as signed data or unsigned data, and wherein the register means retains the sign information representing whether the operand data is signed or unsigned, and wherein if the manipulation control means has decoded the first instruction to obtain the sign information representing whether the operand, specified by the first instruction, is signed or unsigned, then the manipulation control means makes the register means retain not only the operand data but also the sign information, and wherein if the manipulation control means has decoded the second instruction requesting that the operand data retained in the register means be referred to, then the manipulation control means reads out the sign information representing whether the operand data is signed or unsigned, as well as the operand data itself, from the register means, and controls the manipulation means such that the second instruction is executed in accordance with the sign information read out.

10. The processor of claim 9, wherein if the manipulation control means has decoded a fourth instruction requesting that signed operand data be changed into unsigned one, or vice versa, and has obtained new sign information representing whether the operand, specified by the fourth instruction, is signed or unsigned, then the manipulation control means modifies the sign information of the data that is retained in the register means and corresponds to the specified operand.

11. The processor of claim 10, wherein the manipulation control means comprises:

an instruction decoder for decoding a given instruction; and a controller for taking control of writing and reading the size information and the sign information onto/from the register means.

12. The processor of claim 1, wherein the first instruction is either an instruction requesting that operand data be loaded from a memory into the register means or an instruction requesting that immediate operand data be transferred to the register means.

13. The processor of claim 1, wherein the second instruction includes an operation code field that does not contain any information specifying the data size of the operand.

14. The processor of claim 12, wherein the second instruction is either an arithmetic and logical operation instruction requesting that the register means be referred to or an instruction requesting that the operand data be stored from the register means into the memory.

15. The processor of claim 1, wherein if the manipulation control means has decoded a third instruction requesting that operand data be changed into a particular size and has obtained new size information about the data size of the operand that has been specified by the third instruction, then the manipulation control means modifies the size information of the data that is retained in the register means and corresponds to the specified operand.

16. A processor for handling data of multiple sizes, the processor comprising:

manipulation means for performing a manipulation on an operand, the manipulation and the operand both being specified by an instruction, the manipulation means having a bit width corresponding to a maximum one of the multiple sizes; and manipulation control means for enabling only a part of the manipulation means that is associated with a data size of the specified operand, wherein the manipulation means comprises register means for retaining operand data and size information about the size of the operand data, the operand data and the size information are retained in pairs, in the register means.

17. The processor of claim 16, wherein if the manipulation control means has decoded a first instruction requesting that operand data of a particular size be written on the register means and has obtained size information about the data size of the operand specified by the first instruction, then the manipulation control means makes the register means retain not only the operand data but also the size information.

18. The processor of claim 17, wherein if the manipulation control means has decoded a second instruction requesting that the operand data retained in the register means be referred to, then the manipulation control means reads out size information about the size of the operand data, as well as the operand data itself, from the register means, and enables only a part of the manipulation means that is specified by the size information read out from the register means.

* * * * *